United States Patent [19]

Nash

[11] 4,183,448
[45] Jan. 15, 1980

[54] MOULDING OF SYNTHETIC PLASTICS PRODUCTS

[75] Inventor: David D. Nash, Brownhills, Great Britain

[73] Assignee: Durapipe Limited, Staffordshire, England

[21] Appl. No.: 749,092

[22] Filed: Dec. 9, 1976

[30] Foreign Application Priority Data

Apr. 23, 1976 [GB] United Kingdom ............... 16700/76

[51] Int. Cl.² .............................. B29F 3/06; B29F 3/08
[52] U.S. Cl. ............................... 222/63; 222/146 HE; 222/413; 425/144; 425/379 R
[58] Field of Search ..................... 222/146 HE, 52, 63, 222/413; 425/144, 145, 379 R

[56] References Cited

U.S. PATENT DOCUMENTS

| | | | |
|---|---|---|---|
| 3,331,100 | 7/1967 | Gould | 425/379 |
| 3,588,956 | 6/1971 | Poux et al. | 425/379 X |
| 3,822,867 | 7/1974 | Evans | 425/144 X |

FOREIGN PATENT DOCUMENTS

| | | | |
|---|---|---|---|
| 849421 | 8/1970 | Canada | 425/144 |
| 17903 | 8/1965 | Japan | 425/144 |
| 953217 | 3/1964 | United Kingdom | 425/144 |
| 1066806 | 4/1967 | United Kingdom | 425/144 |

*Primary Examiner*—Robert J. Spar
*Assistant Examiner*—Frederick R. Handren
*Attorney, Agent, or Firm*—Burns, Doane, Swecker & Mathis

[57] ABSTRACT

Apparatus for moulding articles of synthetic plastics. Plasticized plastics material is fed by a screw within a cylinder, along the cylinder to a nozzle from whence the material is injected into the mould cavity. The feeding of the material into the mould cavity is however effected by rotation of the screw almost in its forwardmost position instead of by longitudinal movement of the screw from its rearwardmost to its forwardmost position. The longitudinal position of the screw is adjusted during filling of the mould cavity by biasing apparatus acting axially on the screw and controlled by means sensing the position of the screw.

The temperature distribution throughout the cylinder, the nozzle, the screw and the screw tip is controlled by separate cooling circuits for the various zones, the various cooling circuits coming into operation at various times during a moulding cycle, as determined by timing apparatus.

6 Claims, 3 Drawing Figures

MOULDING OF SYNTHETIC PLASTICS PRODUCTS

FIELD OF THE INVENTION

This invention relates to the moulding of synthetic plastics products.

Apparatus for the moulding of plastics products is known which comprises a heatable cylinder fitted at one end with a nozzle adapted to engage a socket at the inlet end of a sprue passage in a mould, a screw disposed axially within the cylinder having its screw crests cooperating closely with the bore of cylinder and the screw being connected at its end remote from the nozzle with a part coaxial with the screw, and extending sealingly through an axial passage at the end of the cylinder remote from the nozzle, to driving means for rotating the screw, the screw being so mounted as to permit rotation thereof within the cylinder. An inlet passage for the supply of plastics material to the cylinder enters the cylinder adjacent the rear end of the screw, from whence such material can be propelled towards the nozzle end of the cylinder.

Apparatus of the kind set forth above is herein referred to as being "of the kind specified".

In a conventional moulding process using apparatus of the kind specified and in which the screw is connected at its end remote from the nozzle with a plain cylindrical part extending sealingly, through said axial passage at the end of the cylinder remote from the nozzle, to hydraulic means for moving the screw axially in the cylinder as well as to said driving means for rotating the screw, prior to each moulding operation, the cylinder is first charged with plastics material, supplied via said inlet passage by rotating the screw to force the plastics material forwards with respect to the screw and thus forcing the screw backwards in the cylinder against the axial force applied by hydraulic biasing means, the material being plasticised by the rotation of the screw and the heat generated thereby, as well as by any additional heating applied to the cylinder. When the screw has moved backwards to a predetermined position in the cylinder, so that a charge of plasticised material is present in front of the screw, this charge is injected into a mould, (the nozzle being engaged with the socket or gate at the inlet end of a sprue passage of the mould) by forcing the screw axially forwards in the cylinder, so that the screw acts as a piston to inject the plastics material into the mould.

This conventional moulding process has a number of disadvantages.

Thus, as the screw moves backwards during charging, the effective plasticising length of the screw, i.e. the distance between the inlet passage and the screw tip is shortened progressively, so that the first part of the material of the charge, plasticised when the screw is substantially in its forwardmost position, is plasticised to the optimum, whereas the last part of the material of the charge, plasticised when the screw has almost reached its rearwardmost position, has not been plasticised to the optimum and as a result there is a viscosity and temperature gradient in the plastics material along the cylinder in front of the screw, and as a result it is difficult to ensure high quality and uniformity in all parts of the article moulded.

Furthermore, the volume of plastics material which can be fed to a mould in one moulding operation is limited by the dimensions of the cylinder.

Another problem encountered with the known apparatus and method is that the continual rotation of the screw generates heat by friction between the plastics material and the screw and cylinder, tending to raise the temperature of the plastics material, and since the time during which the screw rotates during a particular mould filling operation is not in itself controlled, uncontrolled variations in the temperature of the plastics material between successive mould filling operations, as well as during a single mould filling operation may occur, leading to defects, and a lack of uniformity in the moulded products.

SUMMARY OF THE INVENTION

It is an object of one aspect of the present invention to provide an improved moulding process, using apparatus of the kind specified, which avoids the above noted disadvantages arising from withdrawal of the screw while rotating the same to plasticise the plastics material followed by axial forward movement of the screw to inject the plastics material into the mould cavity.

According to one aspect of the invention there is provided a method of moulding an article in plastics material, comprising feeding plasticised plastics material into a mould cavity by means of apparatus of the kind specified, by feeding plastics material into the cylinder via the inlet passage of the cylinder and rotating the screw to feed the plastics material to the nozzle while preventing substantial rearward movement of the screw until the mould cavity is filled or allowing retraction of the screw at varying speeds at any predetermined time during the moulding operation.

Preferably the nozzle has an internal passage which tapers in diameter towards the tip of the nozzle and the screw, at its end nearer the nozzle is provided with a tapering tip shaped to conform closely with the internal passage through the nozzle, and the screw is movable axially in the cylinder, so that in its forwardmost position the screw tip seals off the nozzle to prevent plastics material from the cylinder from issuing from the nozzle, and during filling of the mould cavity the screw is maintained spaced rearwardly of its forwardmost position to an extent which is small in relation to the distance from the nozzle tip to said inlet passage, so that only a narrow annular passage is defined between the tapering tip of the screw and the opposing internal surface of the nozzle.

The variability of said passage or gap and of the length of time that any gap value may be employed during the filling term as provided by the method and apparatus of the invention provide means for obtaining optimum viscosity of the plastics material.

Preferably, during filling of the mould cavity, the screw is moved progressively further from its forwardmost position but its greatest spacing from the forwardmost position, during filling of the mould cavity, is nevertheless small in relation to the distance from the nozzle tip to the said inlet passage.

According to another aspect of the invention there is provided apparatus, of the kind specified, for carrying out the method according to the invention, the apparatus including means for preventing substantial rearward movement of the screw until the mould cavity is filled, or allowing retraction of the screw at varying speeds at any predetermined time during the moulding operation.

Preferably the nozzle in the apparatus according to the invention has an internal passage which tapers towards the tip of the nozzle and the screw, at its end nearer the nozzle is provided with a tapering tip shaped to conform closely with the internal passage through the nozzle, and the screw is movable axially in the cylinder, the screw tip, in a forwardmost position of the screw, sealing off the nozzle to prevent plastics material from the cylinder from issuing from the nozzle, means being provided for biasing the screw axially forwards and means being provided operable to prevent rearward movement of the screw beyond a position spaced rearwardly of its forwardmost position to an extent which is small in relation to the distance from the nozzle tip to said inlet passage, so that only a narrow annular passage is defined between the tapering tip of the screw and the opposing internal surface of the nozzle.

Preferably said means operable to prevent rearward movement of the screw is operable to move progressively rearward, during a mould cavity filling operation, the position beyond which rearward movement of the screw is prevented, so that the width of said narrow annular gap is increased progressively during a mould filling operation.

In a preferred embodiment of the invention at least one sensing means is provided for sensing when the screw has moved rearwardly, away from the nozzle, past a predetermined position spaced rearwardly from the forwardmost possible position of the screw, and biasing means is provided operable in a first state to apply a first predetermined biasing force biasing the screw axially forwards towards the nozzle and in a second stage to apply a second, lesser, biasing force biasing the screw axially forwards, said sensing means being arranged in one condition of the apparatus, to cause said biasing means to change from its said second state to its said first state upon sensing that the screw has moved rearwardly past said predetermined position, thereby urging the screw forwards again past said predetermined position, and being arranged to cause said biasing means to change from its said first state to its said second state on sensing that the screw has moved forwards past said predetermined position, whereby, in operation of the apparatus, the screw may be caused to move backwards to said predetermined position under the action of a melt pressure distribution over the screw tip and along the screw which is sufficient to overcome said second biasing force and after passing said predetermined position may be caused to move forwards past said predetermined position by said first biasing force, where said pressure distribution is not sufficient to overcome said first biasing force, so that while the apparatus remains in one condition, the screw oscillates slightly about said predetermined position as the mean position.

If desired, the size of the gap may be determined or controlled by automatic means, for example, a sensing device which will sense fluctuations of cavity pressure which indicate changes in viscosity of the plastics material. In this case manual means for altering the gap etc., may be omitted.

Preferably the feeding of the material into the mould begins with the screw nearer to the nozzle than said predetermined position, the biasing force initially being said second biasing force, and then the screw is first forced back to said predetermined position said sensing means starts a first timer, and the screw oscillates about said predetermined position in the manner set out above for the duration of a period set by said timer, and after the elapse of this period operation of said sensing means does not cause said first biasing force to be applied but allows the screw to move backwards to a second predetermined position to operate a second sensing means and start a second timer, during the set period of which movement of the screw backwards past said second predetermined position causes said first biasing force to be applied and movement of the screw forwards past said predetermined position causes said second biasing force to be applied, so that during the period determined by said second timer the screw oscillates about said second predetermined position. In a completely analogous fashion, after the end of the period set on the second timer the screw may be allowed to move back to a third position to operate third sensing means and start a third timer, during the set period of which the screw oscillates in an analogous fashion about the third position. Further timers and sensing means operating similarly may be provided as desired so that the mean position of the screw moves progressively further from the nozzle as successive timers come into operation.

While in the preferred embodiment the mean position of the screw moves progressively further from the nozzle as successive timers come into operation, it is possible so to arrange matters, if desirable for any particular set of moulding conditions, that, for example the mean position of the screw moves progressively further from the nozzle for a time, then moves progressively towards the nozzle for a time, then moves progressively backwards for a time. Thus the mean position of the screw with respect to the nozzle may be varied during a moulding operation in any desired manner.

It is an object of another aspect of the present invention to provide an apparatus of the kind specified in which the disadvantage arising from the above noted problem of uncontrolled variations in the temperature of the plastics material are substantially reduced.

According to this aspect of the invention there is provided an apparatus of the kind specified wherein provision is made for regulating the temperature of the cylinder and/or the screw.

Preferably the screw is provided with separate cooling means for the screw tip and the body of the screw, and separate axially spaced zones of the cylinder have respective separate temperature regulating means.

In the preferred embodiment of the invention the cooling means for the screw and the screw tip and the temperature regulating means for the various zones of the cylinder are controlled by timing means arranged to initiate cooling of the screw and screw tip and the various zones of the cylinder at a predetermined time or times before rotation of the screw commences, so as to avoid an overshoot of the temperature of the plastics material above the value desired due to the lag between the initiation of cooling and the full effect of the cooling on the plastics material taking effect.

The invention also extends to articles when made using the method and/or apparatus of the invention.

BRIEF DESCRIPTION OF THE DRAWINGS

In the accompanying drawings.

DETAILED DESCRIPTION

Figure 1:
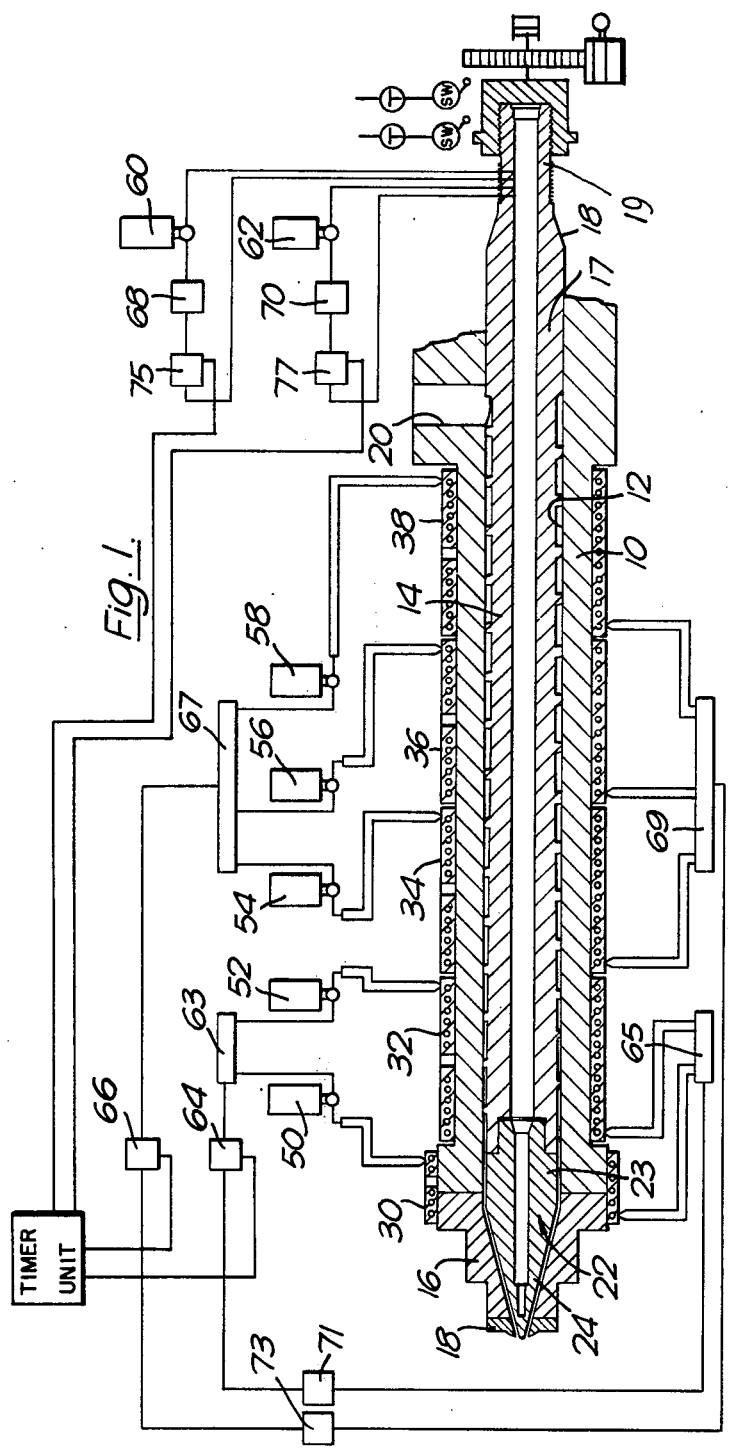
FIG. 1 is a view showing in axial section and somewhat diagrammatically a cylinder and screw of an apparatus embodying the invention, and also showing, schematically, means for controlling the temperature of the cylinder and screw.

Referring to FIG. 1, the apparatus comprises a cylinder 10 having a plain cylindrical bore 12 in which is disposed a screw 14. Secured to the front end of the cylinder 10 is a nozzle 16 the front end of which carries an end piece 18 adapted to engage a corresponding socket at the inlet end of a sprue passage of a mould through which plastics material can be introduced into the mould cavity. The nozzle 16 has an internal passage therethrough comprising a cylindrical portion, adjoining the cylinder 10, and which is formed as a continuation of the bore 12 of cylinder 10, and further comprising a frusto-conical portion extending from the cylindrical portion to the free end of the nozzle, the frusto-conical portion being coaxial with the cylinder 10 and tapering in diameter towards the front end of the nozzle.

The screw 14 comprises a unitary member which, over the major portion of its length, extending from the front thereof, is helically grooved in such a way that in axial section through the screw the axial length of each trough formed is several times greater than the axial length of each crest between adjacent troughs, the peaks of the crests sealingly engaging the bore of the cylinder 10 and the bottoms of the troughs forming respective parts of a frusto-conical surface the diameter of which decreases gradually from the front end of the screw towards the rear end thereof, so that in axial section the area defined between a trough and the opposing part of the bore 12 of the cylinder 10 decreases progressively towards the front end of the screw. Adjacent the rear end of the helically grooved end of the screw is a plain cylindrical part 17, which extends sealingly through the bore 12 at the rear end of the cylinder, and is connected, via a tapering shoulder 18, with an end part 19 of reduced diameter which at its rear end is screw threaded for fitting to screw driving and biasing means not shown, for rotating the screw and applying an axial bias thereto. The cylinder 10 is provided with a radially extending inlet passage 20 intersecting the bore 12 at a position which, in the forwardmost position of the screw shown lies in the zone of the rear end of the helical groove on the screw 14.

The rear end of the bore 12 in the cylinder is not shown, but it will be appreciated that the length of the part of bore 12 extending rearwardly from the position of passage 20, and the length of the plain cylindrical part 17 of the screw are such that the screw can move axially rearwardly of the position shown to a predetermined extent without the helical groove on the screw emerging from the rear end of the bore 12. Secured to the front end of the screw 14 is a screw tip 22 which includes an externally cylindrical portion 23 adjoining the front end of the screw, which fits, with radial clearance, in the bore 12 and the adjoining cylindrical part of the passage in the nozzle 16, and adjoining the portion 23 a conically tapering portion 24 having the same taper as the frusto-conical part of the passage in the nozzle 10, the portion 24 extending, in the forwardmost position of the screw shown, through the nozzle 16 and the opening in the end piece 18 and projecting from said end piece. In the forwardmost position of the screw, the tapering portion 24 of the screw tip engages the frusto-conical part of the passage in the nozzle 10 to seal off the nozzle and prevent plastics material from issuing from the nozzle 16. In the position of the screw shown, in which the screw is displaced backwards slightly from its forward-most position, a radially narrow annular gap is provided between the outer surface of the portion 24 and the opposing surface of the tapering portion of the wall of the passage through the nozzle, thus providing a relatively restricted passage between the bore 12 of the cylinder 10 and the outlet of nozzle 16.

The exterior of the cylinder 10 and the rearmost part of the nozzle 16 are provided with respective temperature regulating jackets, comprising a jacket 30 around the forwardmost zone of the cylinder 10 and the rearwardmost part of the nozzle 16, a jacket 32 around the adjoining next most forward zone of the cylinder, a jacket 34 around the next most forward zone of the cylinder, a jacket 36 around the next zone of the cylinder and a jacket 38, which is the most rearward of the jackets and is engaged around the zone of the cylinder 10 immediately adjacent and forward of the inlet passage 20.

Each of these temperature regulating jackets comprises a cooling jacket around the respective zone of the cylinder 10 and/or nozzle 16, comprising a cooling oil passage extending helically around the cylinder and/or nozzle, and a heating jacket, around the cooling jacket, and comprising, for example, electrical resistance heaters. Each cooling jacket may be formed by cutting into the exterior of the cylinder a continuous helical groove starting at one end of the respective zone and ending at the other end of that zone, the respective zone then being covered by a steel sleeve which is welded into position and defines with the groove a respective helical passage, the sleeve having inlet and outlet holes over the beginning and end of the groove respectively connected with oil supply and return lines. The heating jacket is fitted over the steel sleeve.

Alternatively, each cooling jacket may be formed by winding a copper pipe helically around the respective zone, the ends of the pipe being connected with oil supply and return lines, the heating jacket being fitted over the coil of copper pipe.

Means is also provided for cooling the screw and screw tip. To this end the screw and screw tip are formed internally with cooling passages, or with passages to receive a cooling structure. In order that the temperature of the screw 14 and screw tip 22 can be controlled independently of each other passages are provided for the supply of cooling fluid, e.g. oil, to the screw tip 22 and for the return of such fluid from the cooling tip, and separate passages are provided for the supply of cooling fluid to the screw itself for the return of such fluid from the screw.

Figure 2:
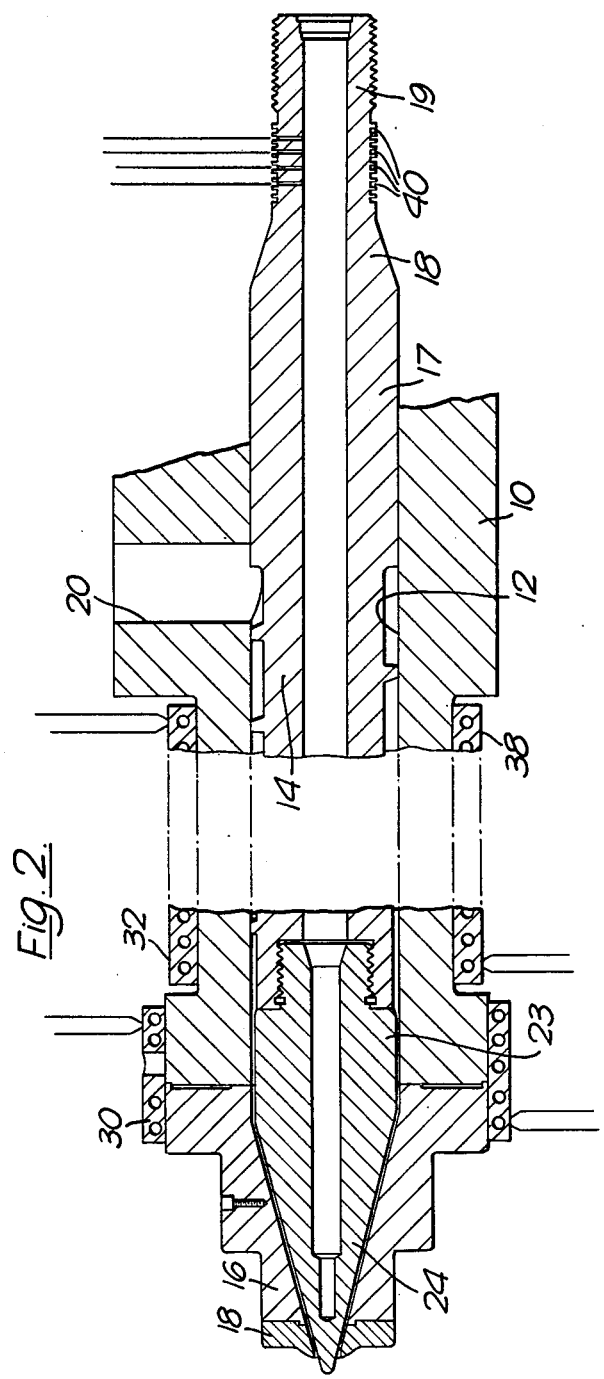
FIG. 2 is a fragmentary view, in axial section, and to a larger scale, of the cylinder and screw of FIG. 1.

As best shown in FIG. 2, the end part 19, adjacent the screw-threaded end thereof, is provided with at least four axially spaced circumferential grooves 40 and cooling fluid supply collar, not shown, fitting sealingly over the portion of end part 19 which is provided with such annular grooves has corresponding fluid supply and return passages, each opening onto a respective one of the grooves 40, each of the latter being connected by a respective passage within the screw, to the respective screw or screw tip cooling means.

It will be noted that with such an arrangement, cooling fluid to and from the screw tip must pass through the length of the screw itself, but in order to minimise the transfer of heat between, on the one hand, the fluid intended for or returning from the screw tip and, on the other hand, the screw itself, the passages through the screw, for the supply and return of cooling fluid to and from the screw tip, are thermally insulated from the screw. The cooling fluid passages within the screw are not shown in FIGS. 1 or 2, but there are shown axial bores in the screw and screw tip adapted to receive an insert which may, by itself, or in cooperation with the bores in the screw and screw tip, define the respective passages for the fluid, the grooves 40 being connected via respective radial bores intersecting the axial bore in the screw, with respective parts provided on the insert, not shown.

The rear end part 19 of the screw is fixedly connected with axial biasing means (not shown), e.g. a hydraulic piston working in a hydraulic cylinder axially aligned with, and fixed with respect to the cylinder, and is also fixedly connected with driving means for rotating the screw, said driving means being operable over a range of axial positions of the screw in the cylinder 10 and during axial movement of the screw over this range. Connected to the screw 14, e.g. connected to a member (not shown) fixed to end part 19, is a cam plate-carrying facility (not shown) carrying a plurality of cam plates (not shown). Each cam plate has associated therewith a respective electrical limit switch operable by a respective cam follower mechanism cooperating with the cam plate, the switch being arranged to be operated when the screw 14 reaches a predetermined axial position in the cylinder 10. Preferably each cam plate is individually adjustably mounted in the cam plate-carrying facility so that the axial position of the screw 14 at which the associated limit switch is operated can be adjusted independently of the adjustment of the other cam plates.

The cam plates are so adjusted that if the screw is displaced axially backwards from its forwardmost position, the limit switches are operated in a predetermined fixed sequence. Among the limit switches referred to are a group of gap setting switches, arranged to be operated in sequence during axial displacement of the screw 14 over a relatively short axial range adjacent the forwardmost position of the screw. Each of these gap setting switches has associated therewith a respective timer, arranged to be started by the first operation of the respective gap setting switch in a moulding operation, and each gap setting switch is arranged, during a predetermined period set on the respective timer, and elapsing after starting of the timer, to control a solenoid operated valve controlling the flow of hydraulic fluid under pressure to the hydraulic piston applying the axial bias to the screw, in such a way that when the respective limit switch is operated a pressure P2 is applied to the hydraulic biasing piston via the solenoid operated valve and an adjustable pressure regulating valve determining the value of P2, whereas when the respective limit switch is released a pressure P3, which may be a lower pressure but is not necessarily so, is applied to the hydraulic biasing piston via the solenoid operated valve and a further adjustable pressure regulating valve determining the value of P3. After the period set on its associated timer has elapsed operation of a gap setting switch has no effect on the solenoid operated valve.

In operation of the apparatus, assuming that a mould filling operation is about to begin, that the screw is in its forwardmost position and that the timers have been reset, the sequence of events is as follows.

Before rotation of the screw commences, and during such rotation until the first gap setting switch is operated, a pressure P1 is applied to the hydraulic biasing piston via a solenoid operated valve and a pressure regulating valve, the pressure P1 serving, before rotation of the screw commences to hold the screw in its forwardmost position and thus seal off the nozzle.

Rotation of the screw commences and as a result pressure builds up in the plastics material within the barrel, the resultant axial force acting rearwardly on the screw as a result of the pressure in the plastics material being sufficient to overcome the axial bias on the screw due to the pressure P1 applied to the hydraulic piston. Consequently the screw begins to move back until the first gap setting switch is operated, so that the first timer is started and the solenoid operated valve associated with the gap setting switches operates to apply pressure P2 to the hydraulic piston, the resulting increased axial bias being sufficient to overcome the axial force on the screw due to the pressure in the plastics material, and thus moving the screw forward again for the very short distance required to release the first limit switch again, whereupon the solenoid operated valve associated with the gap setting switches acts to apply the pressure P3 to the hydraulic biasing piston and the screw begins to move backwards once more until the first limit switch is again operated. Thus, for practical purposes the screw remains substantially stationary at the first gap setting, under a mean biasing force somewhere between that due to pressure P2 and that due to pressure P3 (although, as explained above, the screw oscillates slightly about the first gap setting) during the period set on the first timer. When the period set on the first timer has elapsed, the next time that the screw moves back operating the first gap setting switch, such operation of the first gap setting switch has no effect and the screw continues to move back against the bias due to biasing pressure P3, until it reaches the second gap setting, at which the second gap setting switch is operated starting the second timer and operating the solenoid operated valve once more, so that in a manner exactly analogous to that described with reference to the first gap setting switch the screw remains substantially at the second gap setting for the duration of the period set by the second timer.

As many gap setting switches as desired, with associated timers and arranged to operate in the same way as the first and second gap setting switches described, to provide further gap settings, may be employed.

The pressure P3 is adjustable and is adjusted so as to obtain the desired damping of the axial movements of the screw between gap settings in order to minimise the effect of the gap variation on the condition of the plastics melt.

It will be appreciated that the condition of the plastics material issuing from the nozzle 16 is affected not only by its temperature, but by its plasticisation history, that is by the extent and nature of the action of the screw on the material during the course of its movement along the entire length of the cylinder 10 and nozzle 16 and by the pressure distribution in the plastics material along the cylinder and screw.

Figure 3:
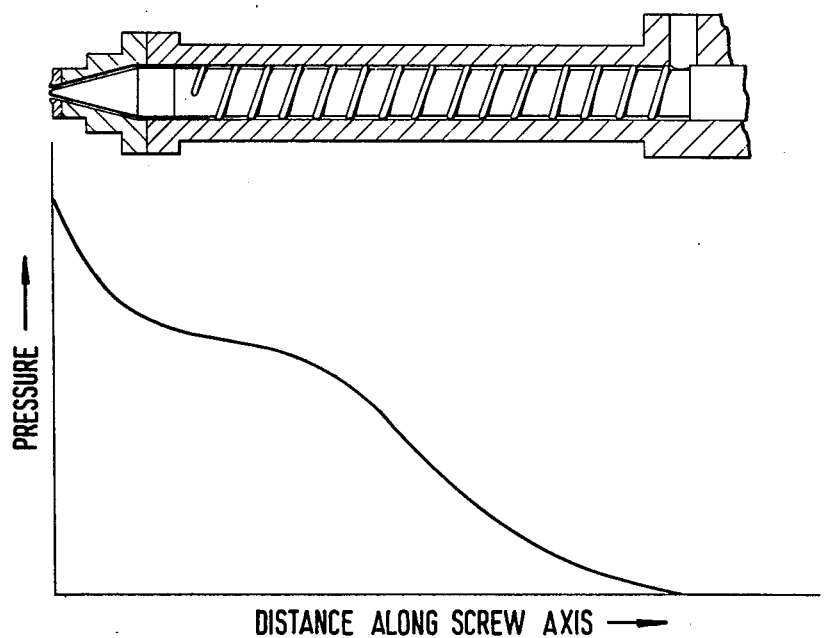
FIG. 3 shows in graphical form the variation in the pressure of the plastics material along the screw during use.

FIG. 3 shows in graphical form the variation in the pressure in the plastics material along the screw, for one particular set of conditions, including one particular gap setting, pressure being plotted along the ordinate and distance along the axis of the screw, from the nozzle 16 being plotted along the abscissa. For clarity, the screw and cylinder are shown schematically above the X axis on the same scale. It will be noted that the pressure falls from a maximum at the nozzle to zero at the inlet passage of the cylinder.

The plastic pressure distribution along the screw is of course a function of the size of the annular gap between the screw tip and the nozzle.

It has been found that by controlling the gap setting in the manner described during mould filling it is possible to control more accurately the plasticisation of the plastics material fed to the mould, and thus to exercise better control over the quality of the moulded product.

Once the last period, set on the timer associated with the last gap setting switch, and initiated by the first operation of the last gap setting switch, has ended, by which time the mould has been filled, the screw continues rotating but a pressure P4 is applied to the hydraulic biasing piston instead of pressure P3 or P2. This pressure P4, controllable via a solenoid and a pressure control valve, does not prevent the screw from moving backwards but allows it to move back under controlled conditions, so as to prevent the plastics melt from decompressing. Decompression of the melt is disadvantageous as its effect will be felt not only at the screw tip but also along the screw.

The screw moves back against the pressure P4 until it reaches its retracted position in which a further limit switch is operated by its respective cam plate, thereby stopping rotation of the screw and starting a further timer which, during a first period set thereon applies a pressure P5 to the hydraulic biasing piston via a solenoid operated valve and a pressure control valve and during a second, subsequent period set thereon applies a pressure P6 to the hydraulic biasing piston, pressure P5 and P6 being separately controlled by respective pressure control valves.

After the end of said second period, the biasing pressure applied to the biasing piston is relieved and the moulding is allowed to cool in the mould before being ejected therefrom. The spacing of the screw from its forwardmost position, during the period in which the gap setting switches are operative, is small in relation to the axial distance between the nozzle and the inlet passage 20, and in relation to the spacing of the screw from its forwardmost positon when said further limit switch is operated.

Returning now to the cooling of the cylinder 10, screw 14 and screw tip 22, and referring again to FIG. 1, each of the temperature regulating sleeves 30 and 38, the screw tip 22 and the screw 14 is supplied with oil via respective flow control valves 50, 52, 54, 56, 58, 60 and 62 respectively. The valves 50 and 52 control the flow of oil from a manifold 63, through the sleeves 30 and 32 respectively to a manifold 65, while the valves 54, 56 and 58 control the flow of oil from a manifold 67 through the sleeves 34, 36 and 38 respectively to a manifold 69. Oil is pumped, by means not shown, from manifold 65, through cooling means (not shown), then through an oil heating unit 71 and a solenoid valve 64 back to manifold 63. Similarly, oil is pumped, by means not shown, from manifold 69, through cooling means (not shown), then through an oil heating unit 73 and a solenoid valve 66 back to manifold 67.

Similarly oil returning from the screw 14 is pumped to an oil heating unit 75 from whence it passes via a solenoid valve 68 to the valve 60 from whence it returns to the screw for further cooling of the latter and oil returning from the screw tip is mounted to a heating unit 77, from whence it passes via a solenoid valve 70 to the valve 62 from whence it returns to the screw tip for further cooling of the latter.

The heating units 71, 73, 75 and 77 are each arranged to bring the oil, cooled by means not shown after leaving the respective temperature regulating sleeve, or the screw or screw tip, to a predetermined temperature or temperatures in order to avoid shock cooling, i.e. the removal of too much heat too quickly.

Each of the valves 50, 52, 54, 56, 58, 60 and 62 is adjustable by means of a respective reversible electric motor, (not shown) operable by a respective control circuit (not shown) which includes a temperature sensing device sensing the temperature of the zone of the cylinder or nozzle surrounded by the respective sleeve, or sensing the temperature of the screw tip respectively, and a respective set valve transducer on which is set the desired temperature of the respective zone or the screw or screw tip respectively. Each such circuit is arranged, when activated during a set time period at the end of each mould filling cycle, to compare the temperature sensed with that set on the respective set value transducer and to cause the respective valve 50 to 62, to be adjusted by its adjusting motor in such a sense as to tend to reduce the difference between the set and sensed values, the rate of such adjustment being proportional to that difference. For example if the sensed temperature is greater than the set temperature, the circuit will cause the motor to increase the opening of the valve to ensure a higher flow rate of oil in the next filling cycle. The duration of said set time period is adjusted so that only a proportion, e.g. up to 80% of the adjustment to a valve which would be required to ensure that there would be no difference between set and sensed values at the end of the next cycle, can be made during the set time period. As a refinement, each said circuit may include an integrating device arranged to calculate the average of the sensed temperature over a cycle or a number of cycles and this average, rather than the instantaneous sensed temperature at the end of a cycle, may be the value which is compared with the set value to determine the adjustment to be made to the respective valve. Preferably each valve, can, if desired, be adjusted manually, overriding the respective control circuit. The set time period referred to occurs after the screw has stopped rotating during each cycle, since the function of the cooling facility is to compensate for heat build-up caused by rotation of the screw.

However, it is desirable to initiate cooling before rotation of the screw begins in each cycle, since, if cooling were started at the same time as rotation of the screw there would be a time delay before cooling became effective at the inner surface of the cylinder or the outer surface of the screw and screw tip, and there would therefore be an overshoot of the temperature of the melt above the desired temperature before cooling became effective through the wall of the cylinder.

To overcome this problem, the flow of cooling oil through the respective temperature regulating sleeves and through the screw and screw tip is started before rotation of the screw commences.

Due to variation throughout the apparatus, of the cylinder and nozzle wall thickness, the thickness of the screw and screw tip, and of the rate of heat build-up in different parts of the cylinder, it is desirable to initiate the cooling of the different zones and of the screw and screw tip, at different times before the commencement of screw rotation. In particular it is desirable that the supply of cooling oil to the sleeves 30 and 32 should be initiated before the supply of cooling oil to the sleeves 34 to 38.

The times at which the supply of cooling oil to the sleeves 30, 32, 34 and 38 is initiated are preferably adjustable to allow for variations in the sectional thermal conductivity of the nozzle and cylinder walls.

To this end, the solenoid valves 64, 66, 68 and 70 are controlled by respective switches operated by a cooling timer unit (not shown). Thus to initiate a complete cycle of the apparatus, this timer unit is started, which opens solenoid valve 60, then e.g. after a first predetermined period the solenoid valve 66, is opened, then after a second predetermined period the valve 68 is opened, then after a third predetermined time period the valve 70 is opened. The valves 66, 68 and 70 need not be operated on the order given. The optimum sequence of operation of these valves and the times at which these valves are operated will depend on the specific moulding operation involved, e.g. the nature of the plastics material, the form of the mould etc.

The cooling timer unit is started by the moulding apparatus reaching a predetermined point in the machine cycle, but is otherwise not controlled by the state of the apparatus. The cooling timer incorporates a switch which until the valves 64 and 66 have been open for a predetermined time prevents the independent means controlling the machine cycle from initiating rotation of the screw. After the valves 64 and 66 and also if desired, valves 68 and 70 have been open for the respective predetermined times, the cooling timer unit assumes a state in which it will allow rotation of the screw to be initiated by said means controlling the machine cycle. At the end of a further period the cooling timer unit causes the valves 64 and 70 to close and activates the valve adjusting circuits for the desired set time period.

I claim:

1. Apparatus for moulding an article in plastics material comprising a cylinder having an axial bore, the cylinder being fitted at one end with a nozzle, the cylinder having an axial passage at its opposite end, a screw disposed axially within the cylinder and having its screw crests cooperating closely with the bore of the cylinder, a part coaxial with the screw and connected with the end of the screw remote from the nozzle, said part coaxial with the screw extending sealingly through said axial passage at the end of the cylinder remote from the nozzle, driving means for rotating the screw being connected with said part, means mounting the screw for rotation and axial movement within the cylinder, the apparatus including means for heating said cylinder, the cylinder further including an inlet passage, for the supply of plastics material to the cylinder, which passage enters the cylinder adjacent the rear end of the screw, the apparatus including means operable to ensure that plastics material can be delivered through the screw out of said nozzle at least principally by rotation of the screw, the apparatus including control means for controlling the axial position of the screw in the cylinder during rotation thereof, the nozzle having an internal passage which tapers toward the tip of the nozzle and the screw, at its end nearer the nozzle, being provided with a tapering tip shaped to conform closely with the internal passage through the nozzle, the screw tip, in the forwardmost position of the screw, sealing off the nozzle to prevent plastics material from the cylinder from issuing from the nozzle, biasing means provided for biasing the screw axially forwards and said control means being operable to control the bias exerted by said biasing means in such a way to prevent rearward movement of the screw beyond a position spaced rearwardly of its forwardmost position to an extent which is small in relation to the distance from the nozzle tip to said inlet passage, so that only a narrow annular passage is defined between the tapering tip of the screw and the opposing internal surface of the nozzle, wherein said control means includes at least one sensing device for sensing when the screw has moved rearwardly away from the nozzle past a predetermined position spaced rearwardly from the forwardmost position of the screw and wherein said biasing means is operable in a first state to apply a first predetermined biasing force biasing the screw axially forwards towards the nozzle and in a second state to apply a second, lesser biasing force biasing the screw axially forwards, said sensing device being arranged to cause said biasing means to change from its said second state to its said first state upon sensing that the screw has moved rearwardly past said predetermined position, thereby urging the screw forwards again, said sensing means being arranged to cause said biasing means to change from its first state to its second state on sensing that the screw has moved forwards past said predetermined position, whereby, in operation of the apparatus the screw may be caused to move backwards to said predetermined position under the action of a melt pressure distribution over the screw tip and along the screw which is sufficient to overcome second biasing force and after said predetermined position may be caused to move forwards past said predetermined position by said first biasing force, where said pressure distribution is not sufficient to overcome said first biasing force, so that while the apparatus remains in one condition the screw oscillates slightly about said predetermined position as the mean position, the apparatus including a plurality of sensing devices each arranged to sense when the screw has moved rearwardly past a respective predetermined position spaced rearwardly from the forwardmost position of the screw, the apparatus including timing means whereby each sensing means is rendered effective to control the axial position of the screw, in the manner set out with respect to the first mentioned sensing device, only during a respective predetermined period, so that during each said period the screw oscillates about the respective predetermined position defined by the respective sensing device.

2. The apparatus of claim 1 wherein said control means is operable to move progressively rearwards, during a mould filling operation, the position beyond which rearward movement of the screw is prevented, so that the width of said narrow annular gap is increased progressively during a mould filling operation.

3. The apparatus of claim 1 including a further sensing device arranged to detect when the screw has moved rearwardly to a retracted position, said further sensing device controlling said driving means for rotating the screw and being arranged to stop said driving means when the screw reaches said retracted position, said further sensing device being arranged, upon detecting that the screw has reached said retracted position to activate a further timing means and to cause said biasing means to apply a predetermined biasing force to said screw to urge the latter forwards for a predetermined period set on said further timer.

4. Apparatus for moulding articles in plastics material, comprising a cylinder having an axial bore, the cylinder being fitted at one end with a nozzle, the cylinder having an axial passage at its opposite end, means for heating the cylinder, a screw disposed axially within the cylinder and having its screw crests cooperating closely with the bore of the cylinder, a part coaxial with the screw and connected with the end of the screw remote from the nozzle, said part coaxial with the screw and extending sealingly through said axial passage at the end of the cylinder remote from the nozzle, driving means for rotating the screw being connected with said part, the apparatus including an inlet passage, for the supply of plastics material to the cylinder, which passage enters the cylinder adjacent the rear end of the screw, the apparatus including means for regulating the temperature of the cylinder, said temperature regulating means including a plurality of cooling means each for cooling a respective zone along the cylinder, said zones being axially spaced along the cylinder, the apparatus including timing means controlling the cooling means for the various zones of the cylinder, the apparatus including control means controlling the machine to operate in a repeating cycle, in which cycle the screw rotates for one part of the time and does not rotate for the other part of the time, said timing means being arranged to initiate cooling of the various zones of the cylinder at predetermined different times in each cycle before rotation of the screw commences.

5. The apparatus of claim 4 for moulding articles in plastics material wherein the means for regulating the temperature of the cylinder also regulates temperature of the screw, the temperature regulating means including means for cooling the screw tip and separate means for cooling the body of the screw.

6. The apparatus of claim 4 in which said timing means is arranged to initiate cooling of a zone or zones nearer the nozzle of the cylinder before cooling of the zone or zones further from the nozzle in each said cycle.

* * * * *